United States Patent [19]

Turley

[15] 3,676,532
[45] July 11, 1972

[54] ALPHA-(DIALKOXYPHOSPHINYL)ARYL METHYL DIALKYL PHOSPHATES

[72] Inventor: Richard J. Turley, Derby, Conn.
[73] Assignee: Olin Corporation
[22] Filed: Nov. 21, 1969
[21] Appl. No.: 878,928

[52] U.S. Cl.....................260/970, 260/2.5 AJ, 260/293.88, 260/347.3, 260/931
[51] Int. Cl.......................................C07f 9/32, C08g 22/44
[58] Field of Search...........................260/970, 931

[56] References Cited

UNITED STATES PATENTS 2,900,408   8/1959   Blasser et al............................260/970

Primary Examiner—Joseph Rebold
Assistant Examiner—Anton H. Sutto
Attorney—Gordon D. Byrkit, Donald F. Clements and Thomas P. O'Day

[57] ABSTRACT

A method for preparing alpha-(dialkoxyphosphinyl) arylmethyl dialkyl phosphates, useful for flame retardants in plastics, especially polyurethanes, condenses dialkyl phosphites with aroyl halides using tertiary alkylamines as hydrohalogen acid acceptors.

7 Claims, No Drawings

ALPHA-(DIALKOXYPHOSPHINYL)ARYL METHYL DIALKYL PHOSPHATES

This invention relates to an improved method for preparing alpha-(dialkoxyphosphinyl) arylmethyl dialkyl phosphates by condensing dialkyl phosphites with aroyl halides using tertiary alkylamines as hydrohalogen acid acceptors. The reaction is exemplefied by the following equation:

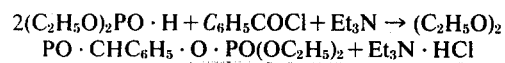
$$2(C_2H_5O)_2PO \cdot H + C_6H_5COCl + Et_3N \rightarrow (C_2H_5O)_2PO \cdot CHC_6H_5 \cdot O \cdot PO(OC_2H_5)_2 + Et_3N \cdot HCl$$

The term "alkyl" as used in the present specification and claims is intended to include halogen-substituted alkyl where the halogen is chlorine or bromine. The phosphates are diphosphates where the aryl is divalent.

The products have previously been prepared using other methods. U.S. Pat. No. 3,042,701 describes certain alpha-[bis(2-chloroethoxy) phosphinyl] hydrocarbyl or halohydrocarbyl bis(2-chloroethyl) phosphates and discloses their utility as lubricant and gasoline additives. An exemplary benzyl compound has the formula $$(ClCH_2CH_2O)_2PO \cdot CHC_6H_5 \cdot O \cdot PO(OCH_2CH_2Cl)_2$$

which is alpha-[bis(2-chloroethoxy)phosphinyl]benzyl bis(2-chloroethyl)phosphate. Compounds of this type have been prepared by oxidation of the corresponding phosphinyl phosphites obtained in turn by reacting an aldehyde with a mixture of a tris(chloroalkyl)phosphite and a bis(chloroalkyl)phosphorochloridite as described in U.S. Pat No. 3,014,951.

According to the process of the present invention, dialkyl phosphate, aroyl halide and tertiary amine are mixed, advantageously in an inert reaction medium, in substantially stoichiometric proportions. The instantaneous reaction is highly exothermic and cooling is usually required. Temperatures of reaction are not critical but are suitably maintained between about 0° and 100° C. The precipitated salts are removed, suitably by filtration and the reaction medium is removed by distillation, evaporation or dilution with water. The recovered phosphinyl phosphate is preferably distilled. Yields vary but range up to 95 percent or higher and are improved over prior art methods.

In the process of the invention suitable dialkyl phosphites include substituted and unsubstituted dialkyl phosphites, for example, dimethyl phosphite, diethyl phosphite, diisopropyl phosphite, di-n-butyl phosphite, bis(2-ethylhexyl) phosphite, bis(2-chloroethyl) phosphite, bis(2-bromoethyl) phosphite and other alkyl and haloalkyl phosphites having one to 12 carbons in each alkyl group. Mixed dialkyl phosphites and mixtures of dialkyl phosphites are suitably used. The halogens are suitably chlorine or bromine.

Suitable aroyl halides are carbocyclic or heterocyclic and are suitably unsubstituted or halogen substituted, for example, benzoyl chloride, benzoyl bromide, 1-naphthoyl chloride, 2-naphthoyl chloride, 9-anthroyl chloride, terephthaloyl chloride, 2-furoyl chloride, picolinoyl chloride, p-bromobenzoyl bromide, 2,4-dichlorobenzoyl chloride, anisoyl chloride, p-toluoyl chloride and other aroyl halides having six to 18 carbons. Mixtures of aroyl halides are suitably used. The halogens are suitably chlorine or bromine.

Suitable tertiary alkyl amines include trimethylamine, triethylamine, triamylamine and other tertiary amines having three to 18 carbons. Mixtures of these tertiary amines are also suitably used.

p-Dioxane is especially preferred as reaction medium but other suitable inert reaction media include benzene, toluene, petroleum ether, chloroform and tetrachloroethylene.

Substantially stoichiometric proportions of dialkyl phosphite, aroyl halide and tertiary alkyl amine are preferably used. Where the aroyl halide is monobasic, the resulting aryl is monovalent and the stoichiometric proportion is 2:1:1 respectively. Where the aroyl halide is dibasic, for example, terephthaloyl chloride, the stoichiometric proportion is 4:1:2 as will be apparent to those skilled in the art. Exact stoichiometric proportions are not critical and variations of 10 percent are satisfactory although yields may not be improved thereby.

The phosphinyl phosphates especially those derived from chloroalkyl phosphites and haloaroyl halides are useful in known polyurethane foam formulations. They are non-fugitive in humid or dry heat aging of the resulting foams and permanently confer flame retardant properties.

EXAMPLE I

A solution of 0.4 mole of bis(2-chloroethyl) phosphite and 0.2 mole of benzoyl chloride in 150 ml. of dioxane was treated dropwise with 0.22 mole of triethylamine. The temperature of the very exothermic reaction was kept below 75° C. The salts were removed by filtration, and the dioxane solution was concentrated under reduced pressure. The residue was poured into 10 percent aqueous sulfuric acid. A carbon tetrachloride extract of the water-insoluble product was washed with water and aqueous sodium bicarbonate. The dried solution was concentrated under reduced pressure. The residual volatiles were removed by heating to about 50° C. in vacuum to give an 89 percent yield of alpha-[bis(2-chloroethoxy) phosphinyl] benzyl bis(2-chloroethyl) phosphate, a light yellow viscous liquid having $n_D^{22}$ 1.5155. Calcd. for $C_{15}H_{22}Cl_4O_7P_2$: Cl, 27.36; P, 11.95 percent Found: Cl, 26.94; P, 11.38 percent

EXAMPLE II

A solution of 0.4 mole of bis(2-chloroethyl) phosphite and 0.2 mole of 3,4-dichlorobenzoyl chloride in 200 ml. of dioxane was treated dropwise with 0.25 mole of triethylamine. The temperature of the very exothermic reaction was kept below 90° C. After the reaction was complete, the dioxane solution was acidified with glacial acetic acid and poured into 500 ml. of water. A chloroform extract of the water-insoluble product was washed with water and aqueous sodium bicarbonate. The dried solution was concentrated under reduced pressure. The residual volatiles were removed by heating to about 55° C. in vacuum to give an 97 percent yield of alpha-[bis(2-chloroethoxy) phosphinyl] 3,4-dichlorobenzyl bis(2-chloroethyl) phosphate, a light yellow viscous liquid having $n_D^{23}$ 1.5288. Calcd. for $C_{15}H_{20}Cl_6O_7P_2$: $Cl$, 36.29; P, 10.56 percent Found: $Cl$, 36.40; P, 10.58 percent

EXAMPLE III

A solution of 118 g (0.4 mole) of bis(2-bromoethyl) phosphite and 28.2 g. (0.2 mole) of benzoyl chloride in 200 ml. of dimethyl acetamide-dioxane (1:1) was treated with 22 g. (0.22 mole) of triethylamine at 30°–73° C. The solution was acidified with glacial acetic acid and poured into 500 ml. of water. A chloroform extract of the water insoluble product was washed with aqueous sodium bicarbonate. The dried solution was concentrated to a liquid residue which was dried in vacuum at about 55° C. to give 122 g. (88 percent) of a light brown oily alpha-[bis(2-bromoethoxy) phosphinyl] benzyl bis(2-bromethyl) phosphate having $n_D^{23}$ 1.5403. Calcd. for $C_{15}H_{22}Br_4O_7P_2$: Br, 45.98; P, 8.91 percent Found: Br, 40.67; P, 9.06 percent.

EXAMPLE IV

The procedure of Example III was repeated using 0.6 mole of bis(2-bromoethyl) phosphite and 0.3 mole of 3,4-dichlorobenzoyl chloride. The product dried at 60° C. in vacuum was 207 g. (90 percent) of light yellow alpha-[bis(2-bromoethoxy) phosphinyl] 3,4-dichlorobenzyl bis(2-bromoethyl) phosphate having $n_D^{24}$ 1.5593. Calcd. for $C_{15}H_{20}Br_4Cl_2O_7P_2$: Br, 41.83; Cl, 9.28 P, 8.10 percent Found: Br, 40.56; Cl, 9.38; P, 7.86 percent

EXAMPLE V

A well-stirred solution of 40.6 g. (0.2 mole) of terephthaloyl chloride and 166 g. (0.8 mole) of bis(2-chloroethyl) phosphite in 500 ml. of dioxane was treated dropwise with 42 g.

(0.4 mole) of triethylamine. The temperature was kept below 50° by the rate of addition of the base. The reaction mixture stood overnight at room temperature. The mixture was acidified with glacial acetic acid and the salts were removed by filtration. The filtrate was concentrated to an oily residue which was poured into water and extracted with ethyl acetate. The organic solution was washed with water and aqueous sodium bicarbonate. The dried solution was concentrated under reduced pressure and the residue was dried at about 50° C. in vacuum to give 180 g. (94 percent) of light yellow alpha, alpha' bis[bis(2-chloroethoxy) phosphinyl] p-phenylene dimethyl tetrakis (2-chloroethyl) diphosphate.

EXAMPLE VI

Repetition of the procedure of Example I substituting dimethyl phosphite for bis(2-chloroethyl) phosphite yields alpha-(dimethoxyphosphinyl) benzyl dimethyl phosphate.

EXAMPLES VII-XIV

In a typical foam formulation, 19 to 27 g. of the additive was blended at ambient temperature with 100 g. of a 3,000 molecular weight triol derived from glycerol and propylene oxide. A total of 1.5 ml. of polysiloxane polyalkylene glycol ester surfactant, 0.5 ml. of triethylene diamine catalyst and 4 ml. of water was blended into the polyol solution. A total of 0.6 ml. of 50 percent stannous octoate catalyst was added to the mixture, then 41 ml. of toluene diisocyanate (an 80/20 mixture of the 2,4 and 2,6 isomers) was added. The isocyanate-polyol mixture was rapidly stirred for about 10 seconds. The formulation was then poured into an open box, whereupon foaming of the reaction mixture occurred. The flexible foam samples thus obtained were ovencured at about 95° C. for about 10 minutes, then cured further at ambient temperature for about 2 days. The flammability of the foams was tested as described in ASTM-D1692-59T. The following table presents the results of the flammability tests.

BURNING TESTS ON FOAMS CONTAINING COMPOUNDS OF THE INVENTION

| Example No. | Product of Ex. No. | (a) Grams | (b) P | (b) Cl | (b) Br | Test (c) Results |
|---|---|---|---|---|---|---|
| VII | I | 25 | 1.6 | 3.7 | — | SE 1.1/7 |
| VIII | II | 27 | 1.6 | 5.5 | — | SE 1.1/5 |
| IX | II | 16 | 1.0 | 3.4 | — | SE 1.7/14 |
| X | III | 26 | 1.2 | — | 6.7 | NB 0.95 |
| XI | III | 19 | 1.0 | — | 5.2 | SE 1.1/4 |
| XII | IV | 21 | 1.0 | 1.1 | 5.2 | SE 1.2/6 |
| XIII | V | 20 | 1.5 | 3.5 | — | SE 1.6/29 |
| XIVA | I | 10 | 0.71 | 1.7 | — | SE 3.2 |
| XIVB | (d) | 10 | 0.68 | 2.3 | — | Burns |
| XIVC | I | 30 | 1.9 | 4.5 | — | SE 1.3 |
| XIVD | (d) | 30 | 1.8 | 6.2 | — | SE 1.6 |

(a) Grams of Product per 100 grams of polyol
(b) Percent of element in foam
(c) SE = Self-extinguishing; figures denote inches burned/per total seconds of burn
NB = Non-burning as defined in test; figures denote inches burned
(d) Tris(2-chloroethyl) phosphate Humid aging tests were conducted at 121° C. in a steam-autoclave for 5 hours. Dry heat aging tests were done at 140° C. for 22 hours in an air-oven. The foam product of Example VII after humid aging showed SE 1.2/7 and the foam product of Example X after humid aging showed SE 1.0/3 and after dry heat aging showed NB.

Example XIV A to XIV D compare the widely used tris(2-chloroethyl) phosphate with the product of Example I as flame retardant. While the tris compound contributes more chlorine to the foam than an equal weight of the product of Example I and about the same amount of phosphorus, the inches burned is more for the tris compound, comparing XIV D with XIV C. The improvement resulting from the use of the product of Example I is more pronounced using marginal amounts of additive. The tris compound as tested in XIV B burned but the product of Example I as tested in XIV A was self-extinguishing.

What is claimed is:

1. Method for preparing alpha-(dialkoxyphosphinyl) arylmethyl dialkyl phosphate by contacting substantially stoichiometric proportions of phosphite ester selected from the group consisting of dialkyl phosphite, dichloroalkyl phosphite and dibromoalkyl phosphite, said phosphite ester having one to 12 carbons, aroyl halide having six to 18 carbons and trialkylamine having three to 18 carbons in solution in an inert reaction medium at a temperature of 0° to 100° C. to form a reaction mixture containing said phosphate and separating said phosphate from said reaction mixture.

2. Method as claimed in claim 1 in which said aroyl halide is monobasic and the molar ratio of said phosphite ester, aroyl halide and trialkylamine is substantially 2:1:1.

3. Method as claimed in claim 1 in which said aroyl halide is dibasic and the molar ratio of said phosphite ester, aroyl halide and trialkylamine is substantially 4:1:2.

4. Method as claimed in claim 1 in which said phosphite ester is bis(2-chloroethyl) phosphite.

5. Method as claimed in claim 1 in which the aromatic nucleus of said aroyl halide is halogen-bearing and said halogen is selected from the group consisting of chlorine and bromine.

6. Method as claimed in claim 5 in which said aroyl halide is 3,4-dichlorobenzoyl chloride.

7. Method as claimed in claim 1 in which said phosphite ester is bis(2-chloroethyl) phosphite, said aroyl halide is 3,4-dichlorobenzoyl chloride, said trialkylamine is triethylamine and said phosphate is alpha-3,4-dichlorobenzyl bis(2-chloroethyl) phosphate.

* * * * *

PO-1050
(5/69)

UNITED STATES PATENT OFFICE
CERTIFICATE OF CORRECTION

Patent No. 3,676,532        Dated July 11, 1972

Inventor(s) Richard J. Turley

It is certified that error appears in the above-identified patent and that said Letters Patent are hereby corrected as shown below:

Claim 7, at column 4, line 53, following "alpha-", insert: --[bis(2-chloroethyl)phosphinyl]--.

Signed and sealed this 24th day of October 1972.

(SEAL)
Attest:

EDWARD M. FLETCHER, JR.
Attesting Officer

ROBERT GOTTSCHALK
Commissioner of Patents